United States Patent [19]
Kierstead et al.

[11] 3,923,784
[45] Dec. 2, 1975

[54] ERYTHROMYCIN A DERIVATIVES

[75] Inventors: Richard W. Kierstead; Ronald A. LeMahieu, both of North Caldwell, N.J.

[73] Assignee: Hoffmann-La Roche Inc., Nutley, N.J.

[22] Filed: Feb. 19, 1974

[21] Appl. No.: 443,561

Related U.S. Application Data

[63] Continuation-in-part of Ser. No. 395,465, Sept. 10, 1973, abandoned.

[52] U.S. Cl. ............................. 260/210 E; 424/180
[51] Int. Cl.² ......................................... C07G 3/00
[58] Field of Search ............................... 260/210 E

[56] References Cited
UNITED STATES PATENTS 3,478,014  11/1969  Djokie et al. ................. 260/210 E
3,736,313  5/1973  Jones et al. ................... 260/210 E

FOREIGN PATENTS OR APPLICATIONS 1,100,267  1/1968  United Kingdom ............ 260/210 E
373,764  1/1964  Germany ....................... 260/210 E

*Primary Examiner*—Johnnie R. Brown
*Assistant Examiner*—Cary Owens
*Attorney, Agent, or Firm*—Samuel L. Welt; Bernard S. Leon; Frank P. Hoffman

[57] ABSTRACT

Novel derivatives of erythromycin A, formed by the cleavage of the cladinose sugar moiety, are disclosed. These compounds are useful as antimicrobial agents.

10 Claims, No Drawings

ERYTHROMYCIN A DERIVATIVES

RELATED APPLICATIONS

The instant application is a continuation-in-part of co-pending application Ser. No. 395,465 filed Sept. 10, 1973 in the names of Kierstead and Le Mahieu, and now abandoned.

DETAILED DESCRIPTION OF THE INVENTION

This invention relates to novel derivatives of erythromycin A, to methods of preparing these derivatives and to novel intermediates employed in these processes. More particularly, the invention relates to derivatives of erythromycin A prepared by cleavage of the cladinose sugar moiety from the antibiotic molecule. These novel derivatives exhibit activity as antimicrobial agents.

The novel derivatives of erythromycin A to which the invention relates are selected from the group consisting of compounds of the formula

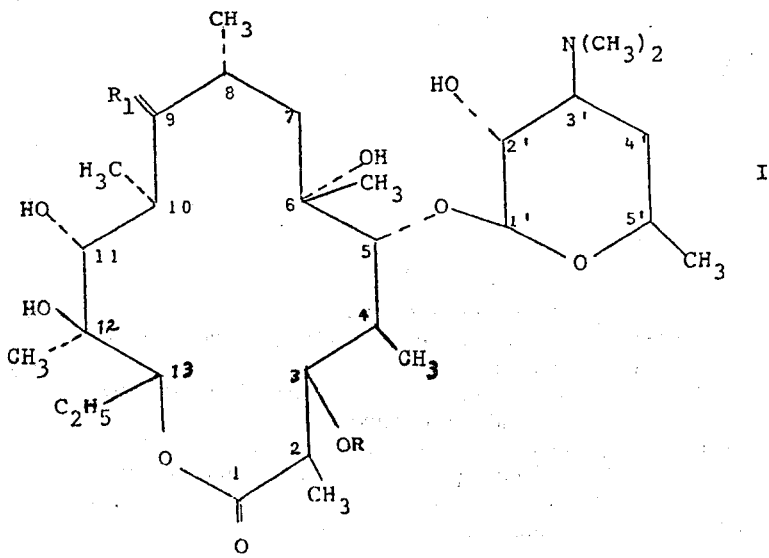

wherein
R signifies acyl and
$R_1$ signifies O or NOH.

As used herein, the term "acyl" includes both lower alkanoyl and aroyl groups. The term "lower alkanoyl" refers to both straight and branched chain aliphatic carboxylic acid moieties containing from 2 to 7 carbon atoms such as acetyl, propionyl, butyryl and the like. The term "aroyl" refers to aromatic carboxylic acid moieties. Examples of such aroyl groups include benzoyl; benzoyl substituted by lower alkyl, lower alkoxy, trifluoromethyl, halogen, nitro, amino or di-lower alkylamino groups; cyclohexanecarbonyl; cyclohexanecarbonyl substituted by lower alkyl, lower alkoxy, trifluoromethyl, halogen, nitro, amino, or di-lower alkylamino; nicotinoyl and the like. The term "lower alkyl" refers to straight and branched chain hydrocarbon groups containing from 1 to 7, preferably from 1 to 4, carbon atoms such as methyl, ethyl, propyl and the like. The term "lower alkoxy" refers to O-lower alkyl groups wherein the lower alkyl moiety is as described above. The term "halogen" refers to all four forms thereof unless specified otherwise.

A preferred class of compounds falling within the scope of formula I above are those wherein the acyl group in the 3-position is a lower alkanoyl group, i.e. compounds of the formula

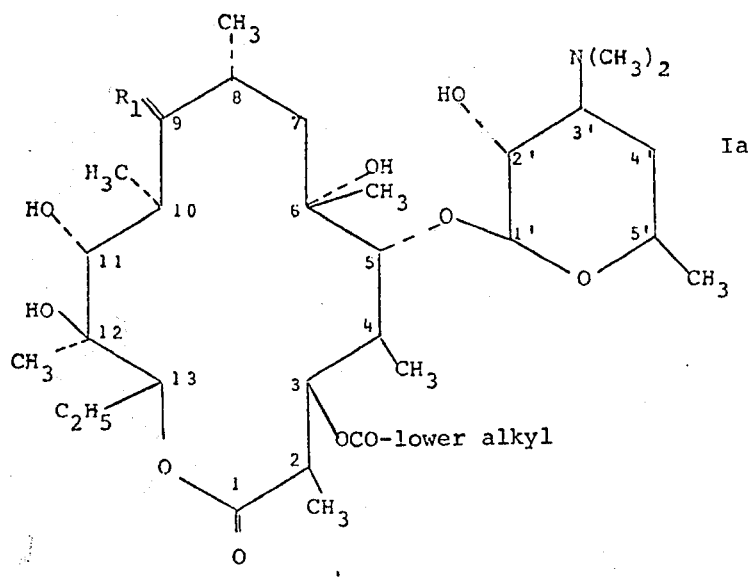

wherein
R₁ is as described above.

Another preferred class of compounds falling within the scope of formula I above are those wherein the acyl group in the 3-position is a benzoyl or substituted benzoyl group, i.e. compounds of the formula

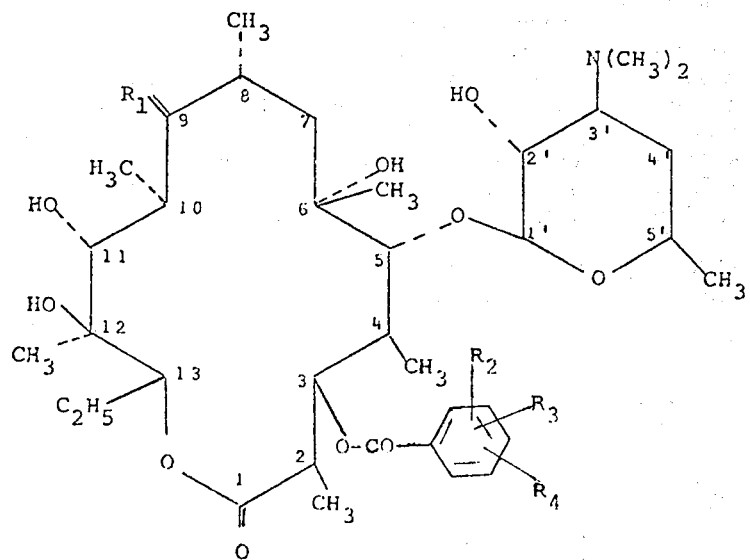

Ib wherein
R₂–R₄ are each independently hydrogen, lower alkyl, lower alkoxy, nitro, halogen, trifluoromethyl, amino or di-lower alkylamino and
R₁ is as described above.

3-benzoyl-5-O-desosaminylerythronolide A oxime;
3-(3-methoxybenzoyl)-5-O-desosaminylerythronolide A oxime;
3-(3,4,5-trimethoxybenzoyl)-5-O-desosaminylerythronolide A oxime;

Representative of the compounds of formula I above are:

3-acetyl-5-O-desosaminylerythronolide A oxime;
3-acetyl-5-O-desosaminylerythronolide A;
3-propionyl-5-O-desosaminylerythronolide A oxime;
3-(3-nitrobenzoyl)-5-O-desosaminylerythronolide A oxime;
3-(3-trifluoromethylbenzoyl)-5-O-desosaminylerythronolide A-oxime; and
3-nicotinoyl-5-O-desosaminylerythronolide A oxime.

The compounds of formula I above are prepared by cleavage of the cladinose sugar moiety from the known oxime of erythromycin A of the formula

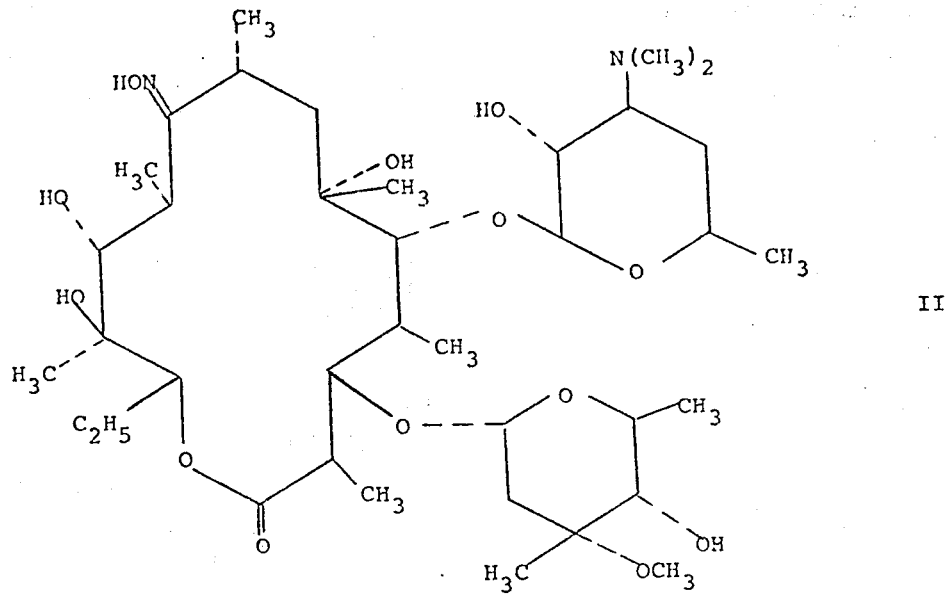

II

Cleavage of the cladinose sugar moiety from the oxime of formula II is accomplished by treating said formula II compound with a mineral acid. Suitable mineral acids for this purpose include hydrochloric acid, hydrobromic acid and sulfuric acid. This reaction is preferably effected in the presence of an inert organic solvent. Examples of solvents that can be employed for this purpose include lower alkanols such as methanol, ethanol, propanol and the like. Temperatures in the range of from about 0° to about 30°C. can be employed for this reaction, with room temperature being preferred.

Treatment of the formula II compound with a mineral acid results in the 5-O-desosaminyl derivative of the formula The acylation of the compound of formula III is effected using conventional acylation techniques. For example, the formula III compound can be treated with an acid anhydride, such as acetic anhydride, propionic anhydride, benzoic anhydride and the like in the presence of an inert organic solvent such as pyridine, acetone and the like. Alternatively, acylation can be accomplished by treating the compound of formula III with an acyl chloride such as acetyl chloride, propionyl chloride, benzoyl chloride and the like in the presence of a suitable solvent system such as sodium bicarbonate in acetone. This reaction can be effected at a temperature in the range of between 0° and 30°C, with room temperature being preferred.

The resulting di-acyl derivative of formula IV above

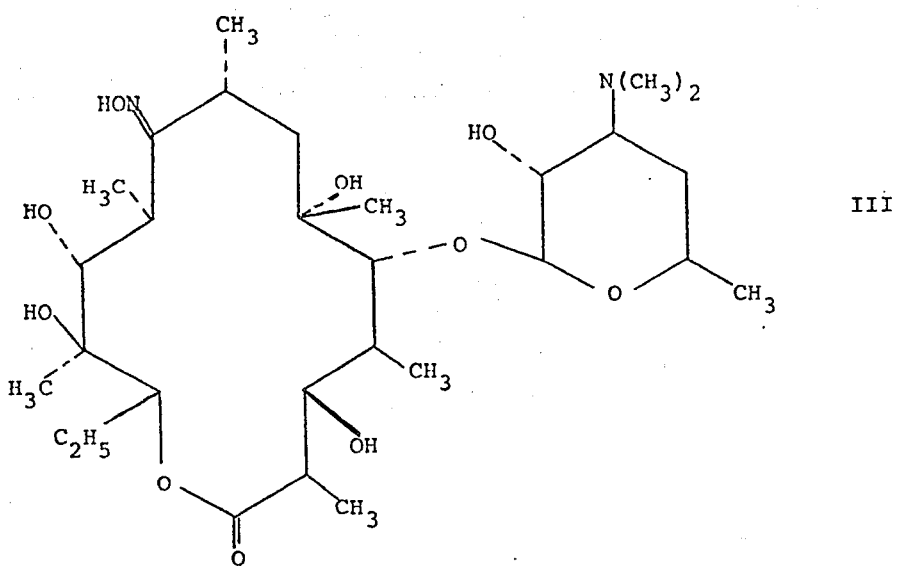

III

The compound of formula III is novel and as such forms a part of the present invention.

In the next step of the process, the desosaminyl compound of formula III is acylated to yield the diacylated product of the formula is novel and as such forms a part of the present invention.

The compounds of formula I above wherein $R_1$ signifies NOH can then be prepared from the di-acyl derivative of formula IV. The conversion of the compound of

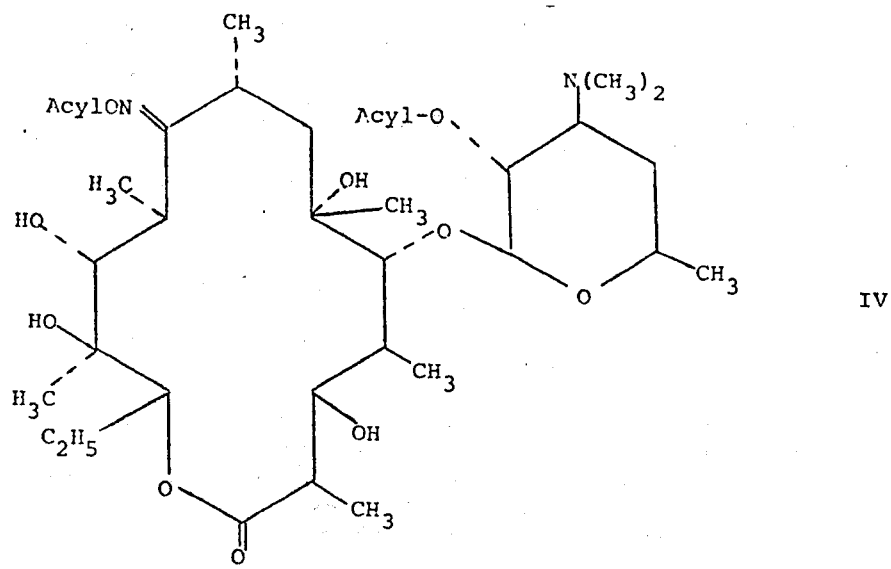

IV formula IV to the oxime of formula I is effected by first acylating the hydroxy group in the 3-position. Since this is a hindered hydroxyl group, the acylation must be effected using more vigorous reaction conditions than employed above in the acylation of the formula III compound. Introduction of the acyl group into the 3-position can be accomplished by treating the formula IV compound with an acid anhydride or an acid chloride. Suitable acylating agents for the present purposes include acetic anhydride, propionic anhydride, benzoic anhydride, benzoyl chloride, 3-methoxy-benzoyl chloride and the like. This acylation is preferably effected in the presence of an organic solvent such as pyridine. This reaction is expediently carried out at elevated temperatures, preferably at a temperature in the range of from about 40° to about 100°C.

This reaction results in the tri-acylated product of formula V below, which is then converted to the desired oxime of formula I by cleaving the acyl groups in the 2'-position and on the oxime oxygen at the 9-position of the compound of the formula

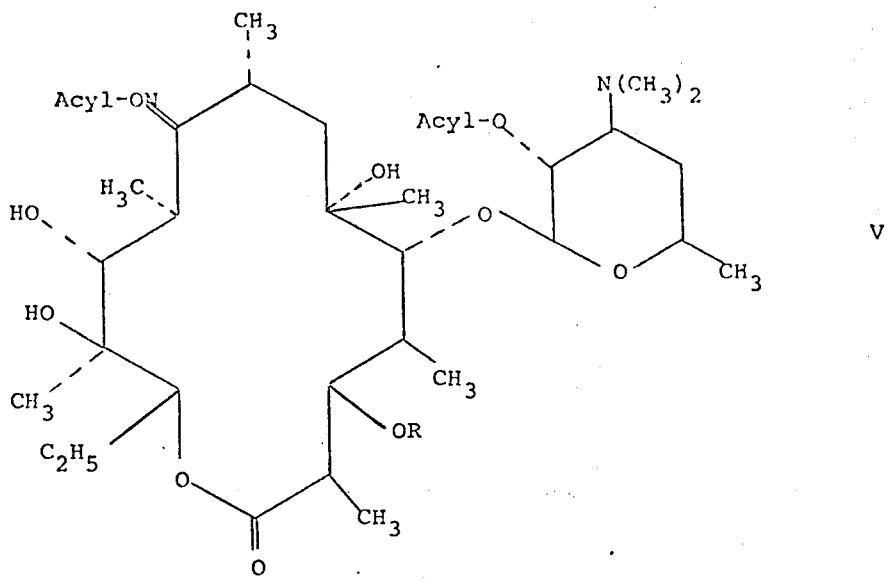

V wherein

R is as described above.

These derivatives of formula V above are novel and as such form a part of the present invention The selective cleavage of the two acyl groups can be effected following conventional techniques. For example, hydrolysis can be accomplished by heating the tri-acylated intermediate in an aqueous medium in the presence of an organic solvent. Suitable solvents for this purpose include lower alkanols such as methanol, ethanol and the like. Temperatures from above room temperature to the reflux temperature of the reaction medium can be employed, with the reflux temperature being preferred. Alternately, the selective cleavage or hydrolysis of the acyl groups in the 2'-position and on the oxime oxygen at the 9-position can be carried out by dissolving the tri-acylated product in a suitable solvent such as a lower alkanol, for example, methanol or ethanol, and then treating the so-formed solution with a base. Suitable bases for this purpose include alkali metal hydroxides such as sodium hydroxide or potassium hydroxide, alkaline earth metal hydroxides such as calcium hydroxide, and alkali metal carbonates and bi-carbonates such as sodium bi-carbonate. If an alkali metal hydroxide is employed for the hydrolysis, two equivalents of the base should be used. This reaction can be effected at temperatures in the range of from 0° to 30°C, with room temperature being preferred.

If desired, the so-obtained oxime of formula I above can then be converted to the corresponding ketone, i.e., the compounds of formula I wherein $R_1$ signifies oxygen. This conversion can be effected by treating the oxime with any system that liberates nitrous acid in the reaction medium. For example, the nitrous acid can be introduced into the reaction zone by first dissolving the oxime in a suitable solvent and then adding to the so-formed solution an alkali metal nitrite, preferably sodium nitrite. Suitable solvents for this purpose include water miscible solvents, for example, lower alkanols such as methanol, ethanol, n-propyl alcohol, isopropanol and the like. Alternately, the nitrous acid can be provided by adding to the solution a lower alkyl nitrite such as methyl, ethyl or amylnitrite. This reaction can be carried out at room temperature or below, with ice bath temperature being preferred.

The compounds of formula I above are useful as antimicrobial agents. Thus, these compounds can be used as medicaments. For example, they can be used in the form of pharmaceutical preparations which contain them in admixture with a pharmaceutical organic or inorganic carrier material which is suitable for enteral or parenteral application such as, for example, water, gelatin, lactose, starches, magnesium stearate, talc, vegetable oils, gum arabic, polyalkylene glycols, vaseline, etc. The pharmaceutical preparations can be prepared in solid form (e.g., as tablets, dragees, suppositories, capsules) or in liquid form (e.g., as solutions, suspensions or emulsions). They may be sterilized and/or contain additives such as preserving, stabilizing, wetting or emulsifying agents, salts varying the osmotic pressure or buffers. They can also contain other therapeutically valuable substances. The compounds of formula I above can be administered at dosages adjusted to individual requirements and fitted to the pharmaceutical exigencies of the situation.

The useful antibacterial activity of the compounds of the present invention can be demonstrated following conventional techniques. Thus, for example, the activity of the compounds of formula I above can be measured in vitro by their zone of inhibition against the microorganisms *Staphylococcus aureus*, *Bacillus subtilis* and *Bacillus megaterium*. In this assay method a paper disc agar diffusion microbiological assay was used to determine the relative antibacterial activity of representative test compounds of formula I. Inoculum was prepared from *Staphylococcus aureus* grown for about 20-24 hours at 35°C on a rotary shaker in 500 ml. cotton plugged Erlenmeyer flasks containing 100 ml. of broth. The inoculum broth for the *Staphylococcus aureus* microorganism is composed of Bacto-peptone 6g/l, cerelose 1g/l, N-Z amine A 4g/l, yeast autolysate 3g/l and beef extract 1.5g/l. Inoculum was prepared from *Bacillus subtilis*, following the above techniques but using an incubation time of from 4-6 days at between 24°-28°C. Similarly, inoculum was prepared from *Bacillus megaterium* using an incubation time of from 6-7 days at between 24°-28°C. For both *Bacillus subtilis* and *Bacillus megaterium*, the inoculum broth is composed of pancreatic digest of casein 17g/l, papaic digest of soybean 3g/l, sodium chloride 5g/l, dibasic potassium phosphate 2.5 g/l, dextrose 2.5g/l, manganous sulfate 0.03 g/l, water to a liter, pH 6.9-7.1 after sterilization. A portion of the cells were inoculated into molten agar (containing the same ingredients as the above-defined broths for each microorganism with the addition of agar-15g/l). The molten agar was then poured into 12 × 88 cm plastic petri dishes and allowed to solidify. The test compounds are dissolved in an inert solvent and applied to 6.5 mm diameter discs which were then placed on the agar. After incubation overnight at 37°C the diameters of the zones of inhibition were measured. The antibacterial spectrum of activity for the test compounds, determined using the above-described assay procedure, is shown in Table 1.

TABLE 1

In Vitro Antibacterial Activity

Diameter of Inhibition Zone in mm.[1] against

| COMPOUND | *Bacillus megaterium* | *Staphylococcus aureus* | *Bacillus subtilis* |
|---|---|---|---|
| A | 13 cfs | 9 ncns | 14 cns (20h) |
| B | 15 cfs (16h) | 9ncns | 14.3 cns |
| C | 12 cfs | 9 ncns | 14 cns |
| D | 16 cfs (19h) | 15 ncns | 18.3 cns(20h) |
| E | 23 cfs (26h) | 19 cns | 22.5 cns(20h) |
| F | 18 cfs (22h) | 13 ncns | 16.5 cns |
| G | 11 h | 7 ncns | 11.5 cns(17h) |

[1]Abbreviations Used:
   cfs = clear, fairly sharp
   h = hazy
   ncns = not clear, not sharp
   cns = clear, not sharp
   Entries in parentheses are for a hazy larger zone of inhibition surrounding the primary zone.
Compound A 3-(2,3-dimethoxybenzoyl)-5-O-desosaminylerythronolide A oxime
         B 3-(3-trifluoromethylbenzoyl)-5-O-desosaminylerythronolide A oxime
         C 3-(3-chlorobenzoyl)-5-O-desosaminylerythronolide A oxime
         D 3-(3-methoxybenzoyl)-5-O-desosaminylerythronolide A oxime
         E 3-(trans-3-methoxycyclohexanecarbonyl-5-O-desosaminylerythronolide A oxime
         F 3-(3-nitrobenzoyl)-5-O-desosaminylerythronolide A oxime
         G 3-nicotinoyl-5-O-

TABLE 1-continued

In Vitro Antibacterial Activity

Diameter of Inhibition Zone in mm.[1] against

| COMPOUND | *Bacillus megaterium* | *Staphylococcus aureus* | *Bacillus subtilis* |
|---|---|---|---| desosaminylerythronolide A oxime.

The following examples are illustrative but not limitative of the present invention. All temperatures are given in degrees Centigrade.

EXAMPLE 1

Preparation of 5-O-desosaminylerythronolide A oxime

A solution of 2.0 g. of erythromycin A oxime [Massey et al., Tetrahedron Letters, 157 (1970)] in 100 ml. of methanol containing 1 percent by weight of anhydrous hydrogen chloride was left at room temperature for 20 hours. Saturated sodium bicarbonate solution (100 ml.) was added and most of the solvent was removed in vacuo. After extraction with three 50 ml. portions of CHCl$_3$, the extract was washed with two 75 ml. portions of 3N HCl to separate the basic product. The combined HCl extract was made basic with 3N NaOH, saturated with NaCl and extracted with CHCl$_3$. The CHCl$_3$ extract was dried and concentrated in vacuo to yield the abovenamed product as a colorless residue which could not be crystallized. Tlc showed a single spot slower moving than the starting material. The nmr spectrum of the crude end product showed the NMe$_2$ grouping at δ2.23 but the —OMe absorption of cladinose was not present. The mass spectrum showed a molecular ion at m/e 590.

EXAMPLE 2

Preparation of 2'-Acetyl-5-O-desosaminylerythronolide A acetoxime

To 1.255 g. 5-O-desosaminylerythronolide A oxime in 50 ml. anhydrous EtOAc was added a solution of 12 ml. Ac$_2$O and 0.03 ml. of 70% HClO$_4$ in 50 ml. of anhydrous EtOAc and left at room temperature for 1 hour. The reaction mixture was washed with 5% NaHCO$_3$ solution, dried and concentrated in vacuo finally with an oil pump to yield a yellow solid. Tlc showed one spot faster moving than the starting material along with a minor impurity. Two crystallizations from CH$_2$Cl$_2$—Et$_2$O gave the above-named product, m.p. 141°-144°.

EXAMPLE 3

Preparation of 3-Acetyl-5-O-desosaminylerythronolide A oxime

A solution of 1.00 g (1.5 mmole) of 2'-acetyl-5-O-desosaminylerythronolide A acetoxime in 20 ml. of pyridine and 4 ml Ac$_2$O (40 mmole) was heated at 70° for 17 hr under an argon atmosphere. The solvent was removed on the oil pump and the residue was dissolved in EtOAc. After washing the solution with 5% NaHCO$_3$ solution, it was dried and concentrated in vacuo. The residue was treated with 10 ml methanol and 1 ml H$_2$O and heated at reflux for 2 hr. Tlc showed a spot moving slower than the starting material along with minor impurities. Water was added to saturation and the product was allowed to cryst to yield the above-named product, mp 247°-250°.

EXAMPLE 4

Preparation of 3-Acetyl-5-O-desosaminylerythronolide A oxime

To 0.385 g (0.61 mmole) of 3-acetyl-5-O-desosaminylerythronolide A oxime in 20 ml of methanol was added a solution of 2.1 g (3 mmole) $NaNO_2$ in 15 ml of $H_2O$. While cooling in an ice bath and stirring, 30 ml (30 mmole) of 1N HCl was added dropwise over 10 min. After standing 5.5 hr at 3°, 25 ml of saturated $NaHCO_3$ solution was added and the methanol was removed in vacuo. The product was extracted with $CHCl_3$ and the extract was dried and concentrated in vacuo to a foam. Tlc showed mainly one spot moving slightly faster than the starting material. Silica gel (15 g) was treated with 7.5 g of $HCONH_2$ in 25 ml of $(CH_3)_2CO$ and the $(CH_3)_2CO$ was removed in vacuo. Chromatography of the crude product on this treated silica gel gave several fractions of pure 3-acetyl-5-O-desosaminylerythronolide A on elution with a solvent mixture of $C_6H_{14}$—$CH_2Cl_2$—EtOH (60:35:5). After concentration in vacuo, each fraction was dissolved in $CH_2Cl_2$, washed twice with $NaHCO_3$ solution and dried. The combined pure fractions were crystallized from $Et_2O$—$C_6H_{14}$ to provide the above-named product, m.p. 183°–187°.

EXAMPLE 5

Preparation of 2′-propionyl-5-O-desosaminylerythronolide A propionoxime

To 1.00 g. (1.69 mmole) of 5-O-desosaminylerythronolide A oxime in 30 ml. of acetone containing 1.0 g. of suspended $NaHCO_3$ was added 0.44 ml. (5 mmole) of propionic anhydride. After stirring at room temperature for 18 hours, the reaction mixture was filtered and the filtrate was concentrated to dryness. Chloroform (50 ml.) was added and the solution was washed with saturated $NaHCO_3$ solution, dried ($MgSO_4$) and concentrated to a foam. Crystallization from $Et_2O$—$C_6H_{14}$ gave the above-named product, m.p. 115°–118°.

EXAMPLE 6

Preparation of 3-Propionyl-5-O-desosaminylerythronolide A oxime

A solution of 0.87 g. of 2′-propionyl-5-O-desosaminylerythronolide A propionoxime in 17 ml. of $C_5H_5N$ and 3.5 ml. of propionic anhydride was heated at 70° for 52 hours. The solvent was removed on the oil pump to yield a dark oil. This oil was dissolved in 30 ml. of MeOH and treated with 0.93 g. of $NaHCO_3$ in 20 ml. of $H_2O$. After standing at room temperature for 16 hours, the MeOH was removed in vacuo. Saturated NaCl solution was added and the product was extracted with EtOAc. The extract was dried ($MgSO_4$), concentrated to a dark foam and chromatographed on 80 g. of silica gel. Elution with a solvent composed of $CH_2Cl_2$:MeOH (95%):concentrated $NH_4OH$ (90:10:1) gave several fractions which were quite pure when examined by tlc. These fractions (220 mg.) were combined and crystallized from $Et_2O$—$C_6H_{14}$ to yield the above-named product, m.p. 230°–236°.

EXAMPLE 7

Preparation of 3-Benzoyl-5-O-desosaminylerythronolide A oxime

To 1.0 g. of 2′-acetyl-5-O-desosaminylerythronolide A acetoxime in 10 ml. of pyridine was added 1.0 ml. of benzoyl chloride and the solution was heated at 90° for 16 hours under an argon atmosphere. The solvent was removed on the oil pump and the residue was dissolved in $CHCl_3$ and washed with 5% $NaHCO_3$ solution. After drying ($MgSO_4$), the extract was concentrated to a dark residue and hydrolyzed by treatment at room temperature in 30 ml. of methanol with 2.5 ml. of 1.0N NaOH for 24 hours. The solvent was removed in vacuo and the product was extracted with chloroform. The concentrated extract was purified by preparative tlc on silica gel using a solvent of $CH_2Cl_2$—90% aqueous MeOH—$NH_4OH$ (90:10:0.1). The major band was scraped from the plate and eluted with MeOH—$CHCl_3$ (1:1). This provided the above-named product as an amorphous solid which could not be crystallized.

EXAMPLE 8

Preparation of 2′-Acetyl-3-benzoyl-5-O-desosaminylerythronolide A acetoxime

To 0.33 g. of 3-benzoyl-5-O-desosaminylerythronolide A oxime was added at room temperature a solution of 0.004 ml. of 70% $HClO_4$ and 1.9 ml. of acetic anhydride in 20 ml. of ethyl acetate. After 1 hour, the solution was washed with 5% $NaHCO_3$ solution, dried ($MgSO_4$) and concentrated in vacuo to a foam. Two crystallizations from ether-hexane gave the above-named product, m.p. 138°–148°.

EXAMPLE 9

Preparation of 3-(3-methoxybenzoyl)-5-O-desosaminylerythronolide A oxime

A solution of 0.50g of 2′-acetyl-5-O-desosaminylerythronolide A acetoxime and 0.50 ml of 3-methoxybenzoyl chloride in 5 ml of anhydrous pyridine was heated at 90° for 21 hr. The pyridine was removed under reduced pressure and the acetyl groups were hydrolyzed by treatment with 1.5 ml of 1.0N NaOH in 30 ml of methanol of at room temperature for 18 hr. The methanol was removed under reduced pressure and the residue was dissolved in chloroform, washed with 5% $NaHCO_3$ and dried ($MgSo_4$). Preparative tlc on silica gel using a solvent system of $CH_2Cl_2$ (90): 95% $CH_3OH$(10): $NH_4OH$ (0.1) provided pure 3-(3-methoxybenzoyl)-5-O-desosaminylerythronolide A oxime, mp 149°–154°.

EXAMPLE 10

A solution of 0.50 g of 2′-acetyl-5-O-desosaminylerythronolide A acetoxime and 0.5 ml of 3-chlorobenzoyl chloride in 5 ml of anhydrous pyridine was heated at 90° for 23 hr. Following the procedure of example 9, 3-(3-chlorobenzoyl)-5-O-desosaminylerythronolide A oxime, mp 156°–162°, was obtained.

EXAMPLE 11

A solution of 0.50 g of 2′-acetyl-5-O-desosaminylerythronolide A acetoxime and 0.50 g of 3,4,5-trimethoxybenzoyl chloride in 5 ml of anhydrous pyridine was heated at 90° for 22 hr. Following the procedure of example, 9, 3-(3,4,5-trimethoxybenzoyl)-5-O-desosaminylerythronolide A oxime, mp 158°–162°, was obtained.

EXAMPLE 12

A solution of 0.50 g of 2'-acetyl-5-O-desosaminylerythronolide A acetoxime and 0.50 g of 2,3-dimethoxybenzoyl chloride in 5 ml of anhydrous pyridine was heated at 90° for 19 hr. Following the procedure of example 9, 3-(2,3-dimethoxybenzoyl)-5-O-desosaminylerythronolide A oxime, mp 221°–225°, was obtained.

EXAMPLE 13

A solution of 0.50 g of 2'-acetyl-5-O-desosaminylerythronolide A acetoxime and 0.50 ml of 4-methoxybenzoyl chloride in 5 ml of anhydrous pyridine was heated at 90° for 24 hr. Following the procedure of example 9, 3-(4-methoxybenzoyl)-5-O-desosaminylerythronolide A oxime, mp 178°–182° then resolidifies and completely melts at 247°, was obtained.

EXAMPLE 14

A solution of 0.50 g of 2'-acetyl-5-O-desosaminylerythronolide A acetoxime and 0.50 g of 3-nitrobenzoyl chloride in 5 ml of anhydrous pyridine was heated at 90° for 19 hr. Following the procedure of example 9, 3-(3-nitrobenzoyl)-5-O-desosaminylerythronolide A oxime, mp 155°–160°, was obtained.

EXAMPLE 15

A solution of 0.50 g of 2'-acetyl-5-O-desosaminylerythronolide A acetoxime and 0.50 ml of 3-trifluoromethylbenzoyl chloride in 5 ml of anhydrous pyridine was heated at 90° for 19 hr. Following the procedure of example 9, 3-(3-trifluoromethylbenzoyl)-5-O-desosaminylerythronolide A oxime, mp 147°–151°, was obtained.

EXAMPLE 16

A solution of 0.50 g of 2'-acetyl-5-O-desosaminylerythronolide A acetoxime and 0.50 ml of 2-fluorobenzoyl chloride in 5 ml of anhydrous pyridine was heated at 90° for 19 hr. Following the procedure of example 9, 3-(2-fluorobenzoyl)-5-O-desosaminylerythronolide A oxime, mp 150°–155°, was obtained.

EXAMPLE 17

A solution of 0.50 g of 2'-acetyl-5-O-desosaminylerythronolide A acetoxime and 0.50 g of 4-nitrobenzoyl chloride in 5 ml of anhydrous pyridine was heated at 90° for 22 hr. Following the procedure of example 9, 3-(4-nitrobenzoyl)-5-O-desosaminylerythronolide A oxime, mp 165°–170°, was obtained.

EXAMPLE 18

A solution of 0.50 g of 2'-acetyl-5-O-desosaminylerythronolide A acetoxime and 0.50 ml of nicotinoyl chloride in 5 ml of anhydrous pyridine was heated at 90° for 16 hr. Following the procedure of example 9, 3-nicotinoyl-5-O-desosaminylerythronolide A oxime, mp 165°–172°, was obtained.

EXAMPLE 19

A solution of 0.50 of 2'-acetyl-5-O-desosaminylerythronolide A acetoxime and 0.50 ml of trans-3-methoxycyclohexanecarboxylic acid chloride [prepared as described by: D. S. Noyce and H. I. Weingarten, *J. Amer. Chem. Soc.*, 79, 3093(1957)] in 5 ml of anhydrous pyridine was heated at 90° for 39 hr. Following the procedure of example 9, 3-(trans-3-methoxycyclohexanecarbonyl)-5-O-desosaminylerythronolide A oxime, mp 128°–134°, was obtained.

Example 20

Tablet Formulation

| | Per Tablet |
|---|---|
| 3-Acetyl-5-O-desosaminylerythronolide A Oxime | 500 mg. |
| Corn Starch | 30 mg. |
| Lactose | 88 mg. |
| Gelatin | 12 mg. |
| Talcum | 15 mg. |
| Magnesium Stearate | 5 mg. |
| Total Weight | 650 mg. |

Procedure 1. 3-Acetyl-5-O-desosaminylerythronolide A oxime and lactose were thoroughly mixed in suitable blending equipment and granulated with a 10% gelatin solution.
2. The moist mass was passed through a No. 12 screen, and the granules were dried on paper lined trays overnight.
3. The dried granules were passed through a No. 14 screen and placed in a suitable mixer. The talcum and magnesium stearate were added and blended.
4. The granulation was compressed into tablets weighing approximately 650 mg. each, using punches having an approximate diameter of 12.7 mm (½ inch). The final tablet thickness was about 5.1 mm.

Example 21

Tablet Formulation

| | Per Tablet |
|---|---|
| 3-Acetyl-5-0-desosaminylerythronolide A oxime | 100 mg. |
| Lactose, USP | 202 mg. |
| Corn Starch, USP | 80 mg. |
| Amijel BO 11* | 20 mg. |
| Calcium Stearate | 8 mg. |
| Total Weight | 410 mg. |

*A prehydrolyzed food grade corn starch. Any similar prehydrolyzed corn starch may be used. Purchased from:
Corn Products Co.
10 East 56th Street
New York, New York

Procedure 1. 3-Acetyl-5-O-desosaminylerythronolide A oxime lactose, corn starch, and Amijel BO 11 were blended in a suitable mixer.
2. The mixture was granulated to a heavy paste with water and the moist mass was passed through a No. 12 screen. It was then dried overnight at 110°F.
3. The dried granules were passed through a No. 16 screen and transferred to a suitable mixer. The calcium stearate was added and mixed until uniform.
4. The mixture was compressed at a tablet weight of 410 mg. using tablet punches having a diameter of approximately ⅝ inch. (Tablets may be either flat or biconvex and may be scored if desired.)

Example 22

| Tablet Formulation | Per Tablet |
| --- | --- |
| 3-acetyl-5-O-desosaminylerythronolide A oxime | 25 mg. |
| Dicalcium Phosphate Dihydrate, Unmilled | 175 mg. |
| Corn Starch | 24 mg. |
| Magnesium Stearate | 1 mg. |
| Total Weight | 225 mg. |

Procedure:

1. 3-Acetyl-5-O-desosaminylerythronolide A oxime and corn starch were mixed together and passed through a No. 00 screen in Model "J" Fitzmill with hammers forward.
2. This premix was then mixed with dicalcium phosphate and onehalf of the magnesium stearate, passed through a No. 1A screen in Model "J" Fitzmill with knives forward and slugged.
3. The slugs were passed through a No. 2A plate in a Model "D" Fitzmill at slow speed with knives forward, and the remaining magnesium stearate was added.
4. The mixture was mixed and compressed.

Example 23

| Capsule Formulation | Per Capsule |
| --- | --- |
| 3-Acetyl-5-O-desosaminylerythronolide A oxime | 50 mg. |
| Lactose, USP | 125 mg. |
| Corn Starch, USP | 30 mg. |
| Talc, USP | 5 mg. |
| Total Weight | 210 mg. |

Procedure:
1. 3-acetyl-5-O-desosaminylerythronolide A oxime was mixed with lactose and corn starch in a suitable mixer.
2. The mixture was further blended by passing through a Fitzpatrick Comminuting Machine with a No. 1A screen with knives forward.
3. The blended powder was returned to the mixer, the talc added and blended thoroughly.
4. The mixture was filled into No. 4 hard shell gelatin capsules on a Parke-Davis capsulating machine.

EXAMPLE 24

| Tablet Formulation | Per Tablet |
| --- | --- |
| 3-Acetyl-5-O-desosaminylerythronolide A oxime | 200 mg. |
| Dicalcium Phosphate Dihydrate, Unmilled | 235 mg. |
| Corn Starch | 70 mg. |
| FD&C Yellow No. 5 - Aluminum Lake 25% | 2 mg. |
| Durkee 117 | 25 mg. |
| Calcium Stearate | 3 mg. |
| Total Weight | 535 mg. |

Procedure:

1. All the ingredients were mixed thoroughly and Fitzed (Model D) using a No. 1A screen, medium speed.
2. The mixture was remixed and slugged.
3. The slugs were screened on an Oscillator through a No. 14 mesh screen and compressed on an "E" machine.

Example 25

| Capsule Formulation | Per Capsule |
| --- | --- |
| 3-acetyl-5-0-desosaminylerythronolide A oxime | 250 mg. |
| Lactose | 60 mg. |
| Corn Starch | 35 mg. |
| Magnesium Stearate | 5 mg. |
| Total Weight | 350 mg. |

Procedure

1. All of the ingredients were mixed until thoroughly blended in a suitable size container.
2. The powder was filled into No. 2, two-piece, hard shell gelatin capsules to an approximate fill weight of 350 mg. using a Parke-Davis capsulating machine. (Any similar type machine may be used.)

We claim:
1. A compound of the formula

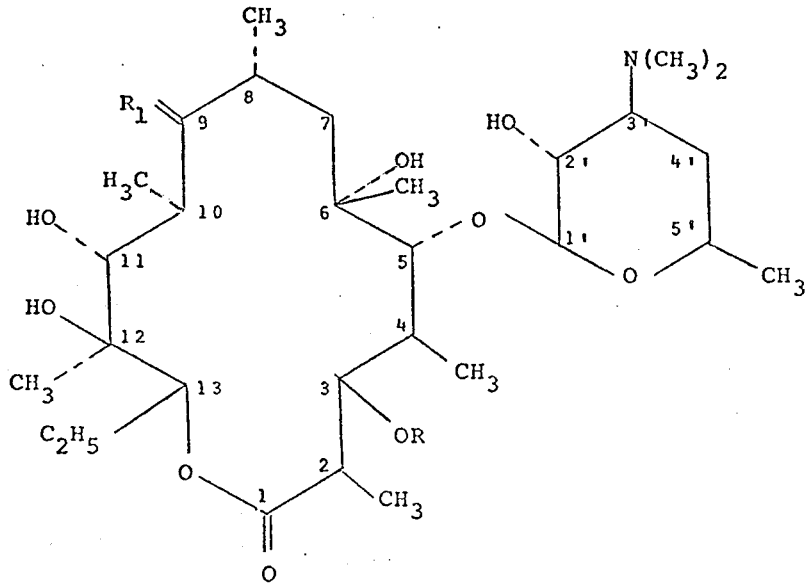

wherein
R signifies acyl and
R₁ signifies O or NOH.

2. The compound of claim 1 of the formula 3-(3-methoxybenzoyl)-5-O-desosaminylerythronolide A oxime.

3. The compound of claim 1 of the formula 3-(3-chlorobenzoyl)-5-O-desosaminylerythronolide A oxime.

4. The compound of claim 1 of the formula 3-(3-nitrobenzoyl)-5-O-desosaminylerythronolide A oxime.

5. The compound of claim 1 of the formula 3-(trans-3-methoxycyclohexanecarbonyl)-5-O-desosaminylerythronolide A oxime.

6. 5-O-desosaminylerythronolide A oxime.

7. A compound of the formula

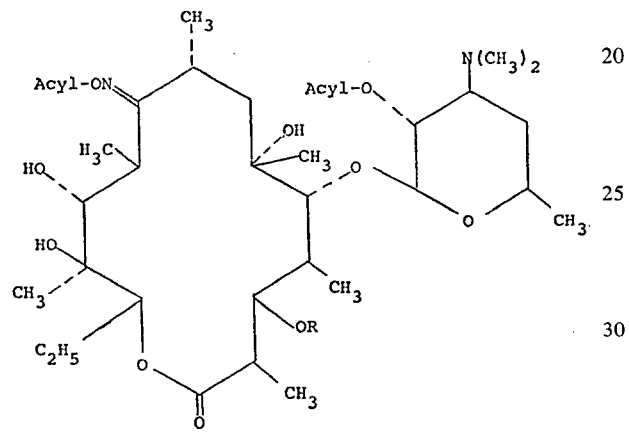

8. The compound of claim 7 of the formula 2'-acetyl-5-O-desosaminylerythronolide A acetoxime.

9. A compound of the formula

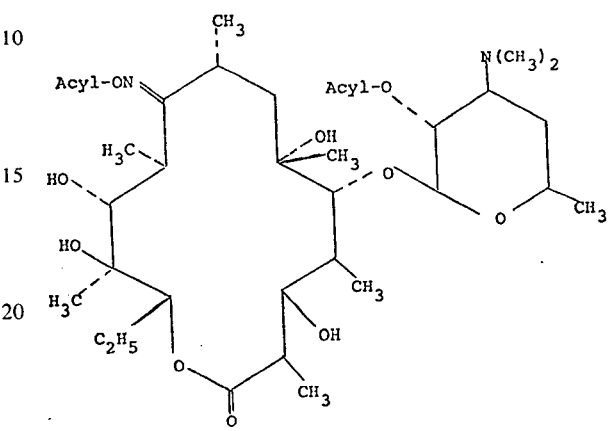

wherein
R signifies acyl.

10. The compound of claim 9 of the formula 2'-acetyl-3benzoyl-erythronolide A acetoxime.

* * * * *

UNITED STATES PATENT AND TRADEMARK OFFICE
CERTIFICATE OF CORRECTION

PATENT NO. : 3,923,784
DATED : December 2, 1975
INVENTOR(S) : Richard W. Kierstead and Ronald A. LeMahieu It is certified that error appears in the above-identified patent and that said Letters Patent are hereby corrected as shown below:

Column 17, the formula

"
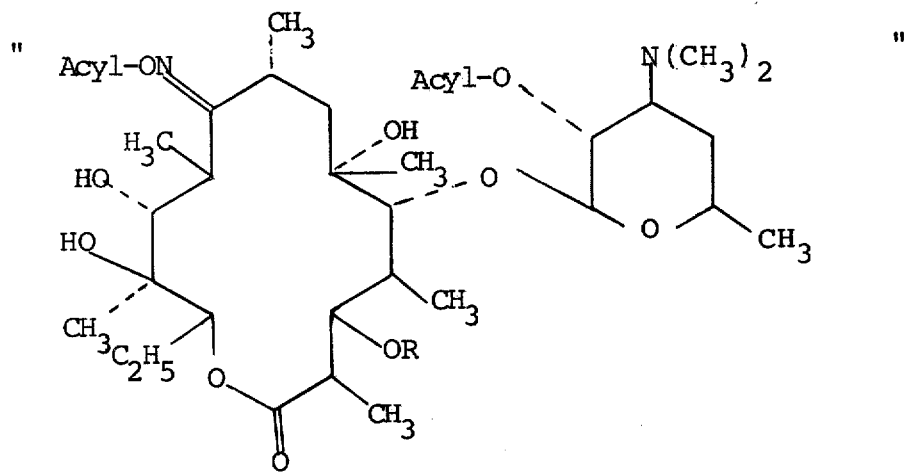
"

Should be

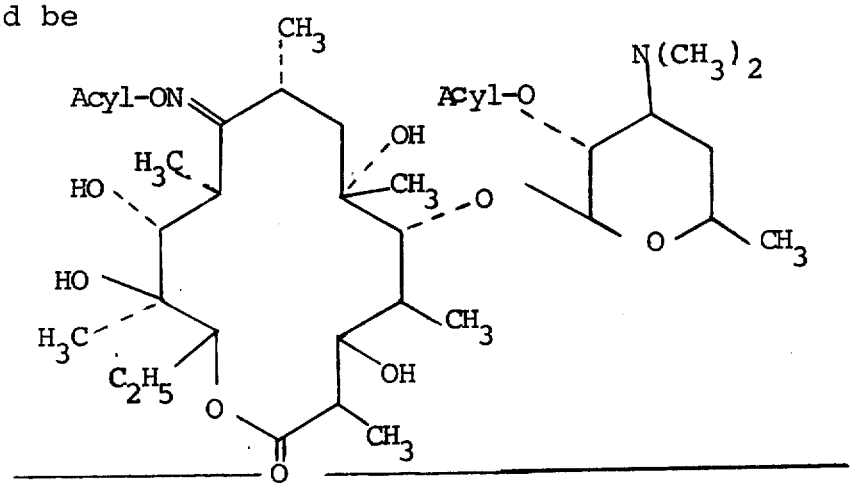

UNITED STATES PATENT AND TRADEMARK OFFICE
CERTIFICATE OF CORRECTION

PATENT NO. : 3,923,784
DATED : December 2, 1975
INVENTOR(S) : Richard W. Kierstead and Ronald A. LeMahieu It is certified that error appears in the above-identified patent and that said Letters Patent are hereby corrected as shown below:

Column 18, the formula

"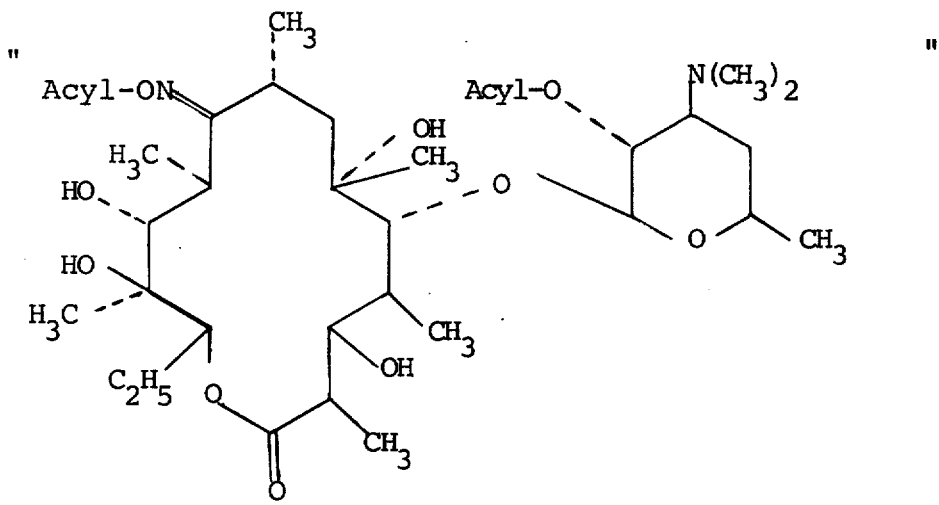"

Should be

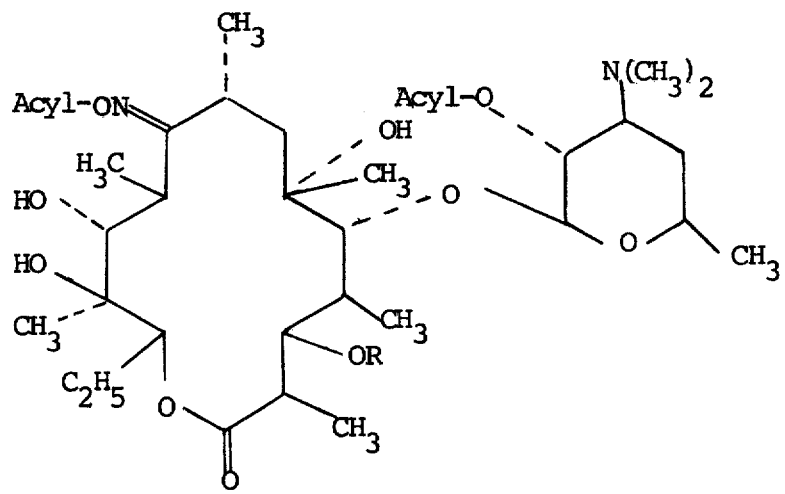

Signed and Sealed this

Third Day of August 1976

[SEAL]

Attest:

RUTH C. MASON
*Attesting Officer*

C. MARSHALL DANN
*Commissioner of Patents and Trademarks*